United States Patent [19]

Fürstenau et al.

[11] Patent Number: 4,928,007
[45] Date of Patent: May 22, 1990

[54] OPTO-ELECTRIC A/D CONVERTER

[75] Inventors: Norbert Fürstenau, Braunschweig, Fed. Rep. of Germany; Christopher Watts, Madison, Wis.

[73] Assignee: Deutsche Forschungs- und Versuchsanstalt fur Luft- und Raumfahrt e.V., Cologne, Fed. Rep. of Germany

[21] Appl. No.: 361,378

[22] Filed: Jun. 5, 1989

[30] Foreign Application Priority Data

Jun. 3, 1988 [DE] Fed. Rep. of Germany ....... 3818865

[51] Int. Cl.$^5$ ............................................. H01J 5/16
[52] U.S. Cl. ..................................... 341/137; 356/345; 250/227.21; 250/227.19; 250/227.27; 250/227.14
[58] Field of Search ........................ 250/227; 356/345; 341/137

[56] References Cited

U.S. PATENT DOCUMENTS

| 4,755,668 | 7/1988 | Davis | 250/227 |
| 4,759,627 | 7/1988 | Thylen et al. | 250/227 |
| 4,763,973 | 8/1988 | Inoue et al. | 250/227 |

OTHER PUBLICATIONS

Electronics Letters, Dec. 9, 1982, vol. 18, No. 25, pp. 1099–1100.
Optical Engineering, vol. 19, No. 4, Aug. 1980, pp. 456–462.
IEEE Journal of Quantum Electronics, vol. QE-14, No. 3, pp. 207–213.
IEEE Journal of Quantum Electronics, vol. QE-14, No. 8, pp. 577–580.
IEEE Journal of Quantum Electronics, vol. QU-18, No. 12, pp. 1010–1015.

Primary Examiner—David C. Nelms
Assistant Examiner—Khaled Shami
Attorney, Agent, or Firm—Salter & Michaelson

[57] ABSTRACT

An opto-electronic A/D converter comprises an input light source, an input interferometer, and a plurality of parallel multistable interferometers the optical lengths of which are controlled by respective electrodes, the outputs of the parallel interferometers being converted by photodiodes into electrical signals which are used both to supply a digital output of the converter and as feedback signals to both the respective and an adjacent one of the parallel interferometers.

10 Claims, 5 Drawing Sheets

OPTO-ELECTRIC A/D CONVERTER

BACKGROUND OF THE INVENTION

The present invention relates to an opto-electronic A/D converter with a plurality of parallel-connected optical wave guide interferometers.

A known opto electronic 4-bit A/D converter of this type is constructed from four integrated optical Mach-Zehnder interferometers having electro optical phase modulators. The interferometers have a common input, to which a laser light source is connected. In this arrangement an interferometer is associated with each bit of the signal which is to be digitalised. The analog input signal is applied as an electrical voltage to the phase modulators, which have an electrode or contact length which decreases from the lowest bit (LSB) to the highest bit (MSB). The length is so dimensioned in each case that the four interference signals (light/dark conditions of the light intensity) registered from the photo diodes to the interferometer outputs represent the analog input voltage in the gray-code (Electronic Letters, Dec. 9, 1982, vol. VL 18 No. 25, pp. 1099–1100).

An electro optical multi-stable element is further known which relates to a conventional Fabry-Perot resonator with an electro optical crystal as the phase modulator between the mirrors. The length of the optical resonator is controlled by a voltage applied to the modulator via the electro optical effect. By feeding back the transmitted signal to the modulator this arrangement becomes multistable, i.e. a continuously changed input light power radiated into the resonator produces a stepwise changing discrete transmitted output signal. In the treatise quoted, 14 stable stages were produced (Optical Engineering 19 (4) (1980), p. 456).

Furthermore, tests are known on the bistable characteristics and multivibrator properties of an integrated optical Mach-Zehnder interferometer with feedback on to electro optical phase modulators (IEEE J. Quantum Electron. QE 18 (12) (1982), pp. 2010–2015.

SUMMARY OF THE INVENTION

Analog-to-digital converters (ADC's) are required for on-line processing of measured values with electronic computing equipment. These convert an analog, time-dependent measured signal at fixed time intervals into an output signal which has been made discrete, in which binary coded words of typically 8 to 16 bits in length are associated with the individual measured values. In order to minimise the information loss occurring during digitalisation the clock frequency should be as high as possible and the bit length of the words should be as large as possible for the individual measured values.

For the conversion of optical signals, as delivered by the light wave guide (glass fibre) sensors developed for some years it would be advantageous if the analog-digital conversion could be carried out optically or electro optically.

In contrast to the conventional binary coding with bistable electronic trigger stages or flip flops the (electro) optical multistability opens up the possibility of a multi-value, coding, a perspective which is of interest too with respect to a currently disputed multi value logic in optical computers. A multi value coding leads to the reduction in the number of ADC modules required for conversion. Also the use of integrated electro optical modulators with frequency band widths in the GHz range makes very high scanning frequency seem possible.

The present invention seeks to provide a way of continuously converting continuously changing input signals in the form of light intensities or electric voltages into discrete output conditions with an opto electronic A/D converter of the type specified and to output these in coded form directly either in binary or, using them multistability hexadecimally or decimally for example.

Accordingly, the present invention provides an opto-electronic A/D converter with a plurality of parallel connected light wave guide interferometers acted upon by a single input light source, said interferometer having electrodes arranged parallel thereto the optical path lengths of said interferometers being defined by electrical fields between said electrodes, a respective photodiode being connected after each of said interferometers, said photodiodes transforming the output signal of said interferometers in each case into an electrical voltage, said electrical voltages being amplified and displayed, wherein a common input interferometer is connected in front of a common input of a plurality of parallel multistable interferometers, said input interferometer being acted upon by said input light source and having electrodes for application of an electrical input voltage, each of said parallel interferometers having a respective amplifier connected to receive the output voltage of a respective said photodiode, the amplified output voltages of said photodiodes being connected to said respective electrodes and the output voltage of a said respective photodiode of a higher value interferometer is in each case further connected up as the offset voltage to a said amplifier of the interferometer which has a lower value, and the output voltages of said individual amplifiers are tapped in each case as digital signals and from these a coded output signal of the A/D converter is formed, and means are provided for producing a periodically clocked resetting signal.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Basically the present invention relates to an optoelectronic A/D converter comprising an input light source, an input interferometer acted upon by said light source and having an output, a plurality of parallel multistable interferometers having a common input, said output being connected to said common input, said interferometers having respective electrodes arranged parallel thereto defining the optical path lengths thereof, means for applying an electrical input voltage to said electrodes of said input interferometer, the optical output signal from each said parallel interferometer being supplied to a respective photodiode transforming the optical signal into a respective electrical voltage, said electrical voltages being supplied to an input of a respective amplifier, each said amplifier comprising, in addition to said input, an offset voltage input and an output, said outputs of said amplifiers being connected to said respective parallel electrodes of a respective said parallel interferometer and said electrical voltages being connected to said offset voltage inputs of, in each case, a said amplifier of a respective adjacent parallel interferometer, means for forming an output signal of said A/D converter from said output signals of said amplifiers, and means for producing a clocked reset signal.

Figure 1:
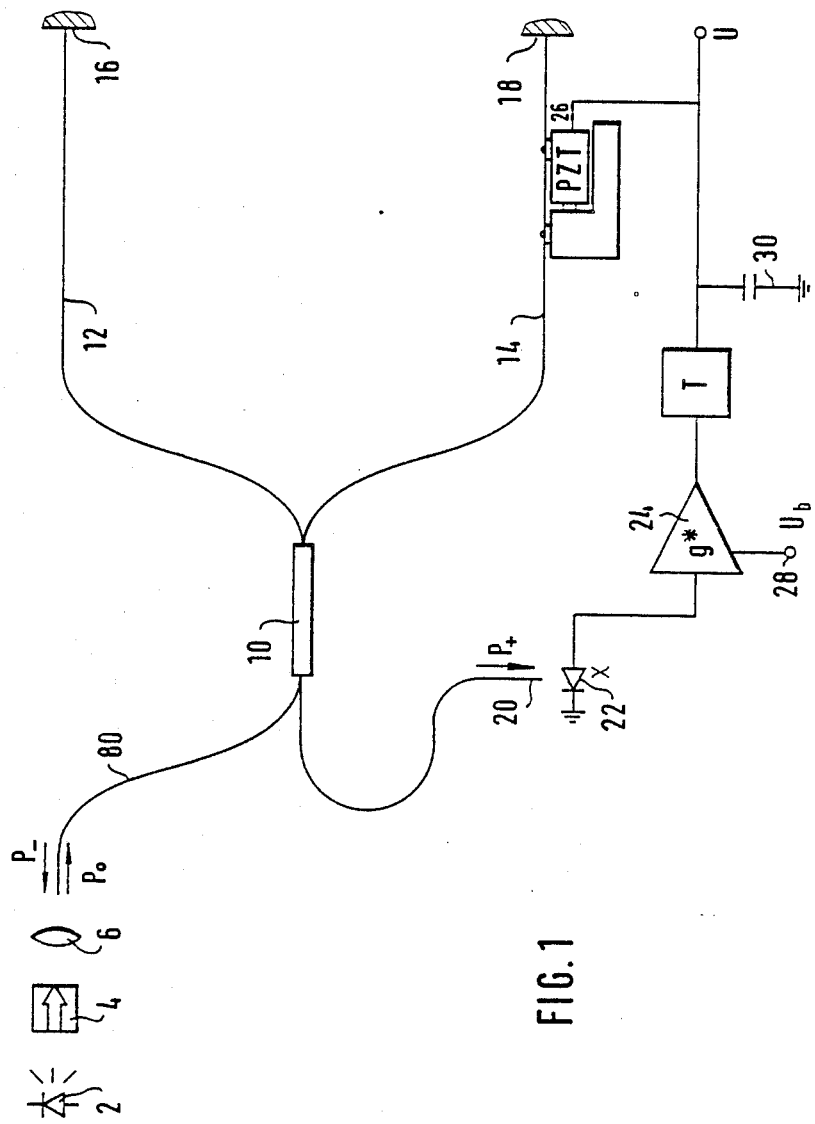
FIG. 1 shows a fibre optic Michelson interferometer together with its circuitry schematically as the basic element of an optical ADC.

The ADC described in the following consists of a system of multistable interferometers which are coupled together as the ADC basic modules, in which light wave guides in the form of monomode glass fibres or based on integrated optics are used. The base element of the optical ADC is a Michelson or Mach-Zehnder interferometer with feedback of the output signal to a phase modulator, which affects the optical path length of one of the two interferometer arms (for example by mechanical expansion of the glass fibre). FIG. 1 shows this using the example of a Michelson interferometer constructed from monomode glass fibre with a piezoelectric phase modulator 26, which is able to expand a portion of the fibre 14 mechanically. The bundle of light from a laser 2 (He-Ne or semiconductor laser diode) is coupled with the aid of an optical focussing device 6 (e.g. microscope lens) into the input arm 8 of the interferometer. The optical insulator 4 suppresses back reflection into the laser, which may lead to instability. The input light wave is coupled 50% into each of the reference arm 12 and signal arm 14 in the fibre optic beam splitter 10 (3 dB coupler), where the partial waves are reflected back from the mirrored end faces 16 and 18 to the beam splitter 10. The superimposition in the beam splitter produces an interference signal in the form of an output light power P±, which depends on the optical path difference between the two interferometer arms. The interference signal P+ is converted into a proportional voltage at the output gate 20 of the interferometer by a photo diode 22 with conversion factor k, and is applied as a control voltage U to the (in this example piezoelectric) phase modulator 26 with a time constant t after a delay time T amplified by a factor g (amplifier 24). The voltage U (proportional to P+) is at the same time the output signal of this ADC module. P− is blocked of by the optical isulator 4 from the laser diode.

The stationary characteristics of the arrangement are obtained from the equation for the output power of a two arm interferometer:

$$P_{out}\pm = \frac{P_{in} I}{4(1 + \mu)} [1 \pm \mu\cos(\Delta\phi + \phi_b)] \quad (1)$$

in which the transmission factor T and the modulation index $\mu$ (interference contrast) are determined by the birefringence of the light wave guide, the divider ratio (reflectivity) of the coupler (beam splitter) and the polarisation of the inwardly and outwardly coupled light waves. $\phi_b$ is a constant phase term, which may be adjusted by a bias voltage $U_b$ across terminal 28 on the phase modulator. The $\pm$ sign corresponds to the phase shift of $\pi$ between the two output signals of the interferometer. In FIG. 1, P+ is taken as the output signal. $\Delta\phi = \pi U(t)/U_\pi$ is the phase difference between the two interferometer arms, controlled by the modulator, and thus a function of the modulator voltage U(t), $\Delta\phi = \pi$ for $U = U_\pi$.

Because of the feedback the modulator voltage may be written as follows at the time t as a function of the light output:

$$U(t) = KgP(t)_t - \tau \frac{dU}{dt} \quad (2)$$

The second term on the right side takes account of the finite time constant $\tau$ of the fedback system, which with integrated optical modulators comes into the order of magnitude of $\tau \approx 1$ ns. When using piezoelectric modulators even high time derivatives in U have to be taken into account, because of the mechanical resonance characteristics of these elements.

By using (2) in (1) a differential-difference equation is obtained which describes the dynamic characteristics of a Mach Zehnder or Michelson interferometer with electro optical feedback:

$$\tau \frac{du}{dt} + u(t) = \frac{G}{1 + \mu} [1 + \mu\cos(\pi(u(t - T) + u_b))] \quad (3)$$

in which T is the feedback delay time (which is not to be confused with the transmission factor T), $G = kg P_o T/U_{90}$, and $u(t) = U(t)/U_\pi$, $u_b = U_\pi/U$ were introduced as dimensionless voltages. Equation (3) was investigated in DFVLR Report 87/21 with regard to multistability. Here the stationary characteristics are chiefly of interest. This is described by the equation:

$$u^* = \frac{G}{1 + \mu} [1 + \mu\cos(\pi(u^* + u_b))] \quad (4)$$

Figure 2:
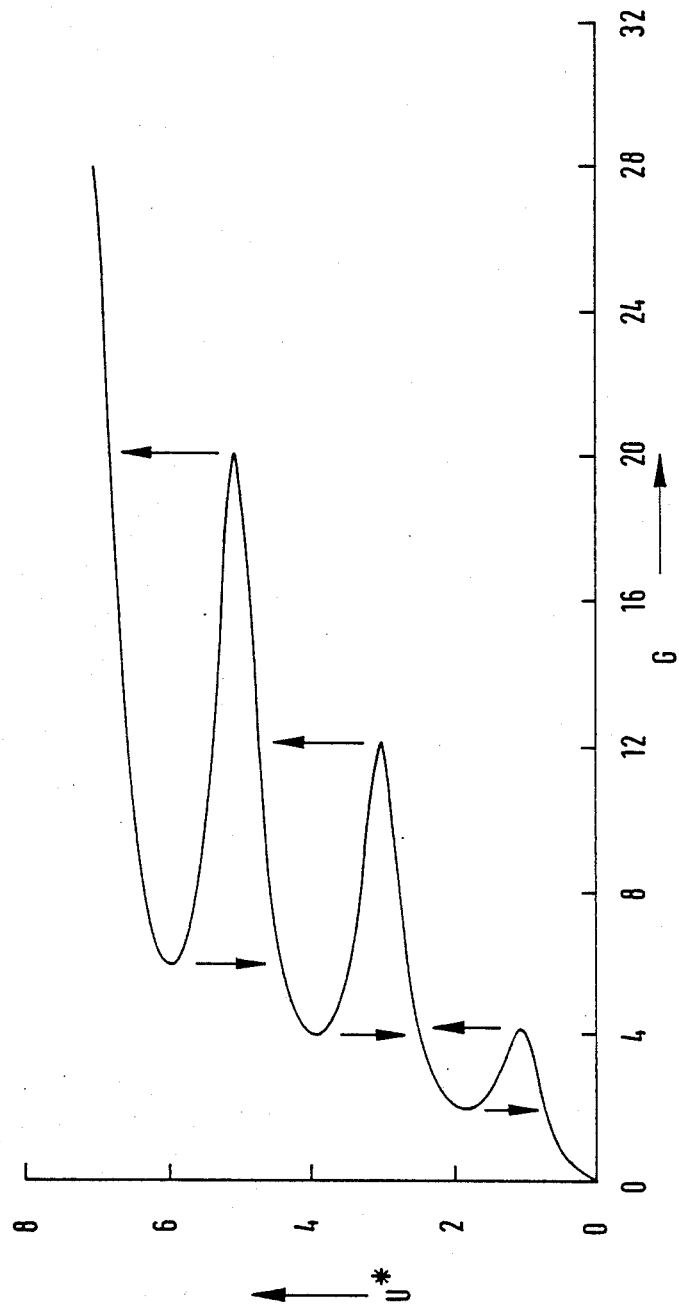
FIG. 2 shows a diagram of a typical hysteresis curve with the stationary values of the initial intensities as a function of the proportionality factor.

FIG. 2 shows the stationary fixed points u* as a function of the proportionality factor G (proportional to the input power P. and to the amplification g). The characteristic of this curve is the hysteresis characteristic of the stationary output signals u* of the system in dependence on G. With continually increasing $P_o$ the output signal will only increase a little, until at certain value of $P_o$ it jumps to a higher level, where the process is repeated. The intervals between the plateaus of the dimensionless output voltage amount to approximately $\Delta u^* \approx 2$. An estimate for the digital resolution resolution of the individual multistable element is obtained by means of the relative maxima of G(u*), while the cosine term in Eqn. (4) is approximated with −1:

$$\Delta G \approx 2 \frac{1 + \mu}{1 - \mu} \quad (5)$$

The resolution in G (increase in the "Upwards" branch of the hysteresis curve in FIG. 2) is therefore determined by the modulation index $\mu$ (interference contrast).

The stationary solutions of Eqn. (3), as shown in FIG. 2, are only stable under certain conditions (DFVLR Rep. 87/21, p. 243). The non-linearity of the fedback system does lead from certain G values onwards, socalled bifurcation points, initially to periodic and finally to chaotic behaviour of the output signal. The stable regions of the stationary solutions are given by the relationship between the feedback delay time T and the modulator time constants $\tau$: the smaller $T/\tau$, the greater the G region for stable solutions $u^*$, and correspondingly more jumps in $u^*$ are possible (e.g. $\mu=0.5$; $T/\tau=10$: 46 jumps in the region $G=0\ldots 200$). For multistability $T/\tau$ must in general be $<<1$.

Fibre optic multistable interferometers with feedback via a piezoelectric phase modulator permit fundamentally very many discrete stages in the output signal when $\tau$ is suitably selected (settable e.g. by a capacitance 30 which is parallel connected to the PZT 26: e.g. $\tau \approx 10^{-3}$s when $T \approx 10\mu$s) and when the modulation index $\mu$ is sufficiently small.

With regard to the miniaturising capability integrated optical interferometers with electro optical phase modulators are preferably used for the ADC. Such components based on LiNB crystals with Ti diffused optical wave guides are known. A further advantage of such an integratedly optical chip is the high modulation frequency facilitated by means of the linear electro optical effect into the GHz range.

Figure 3:
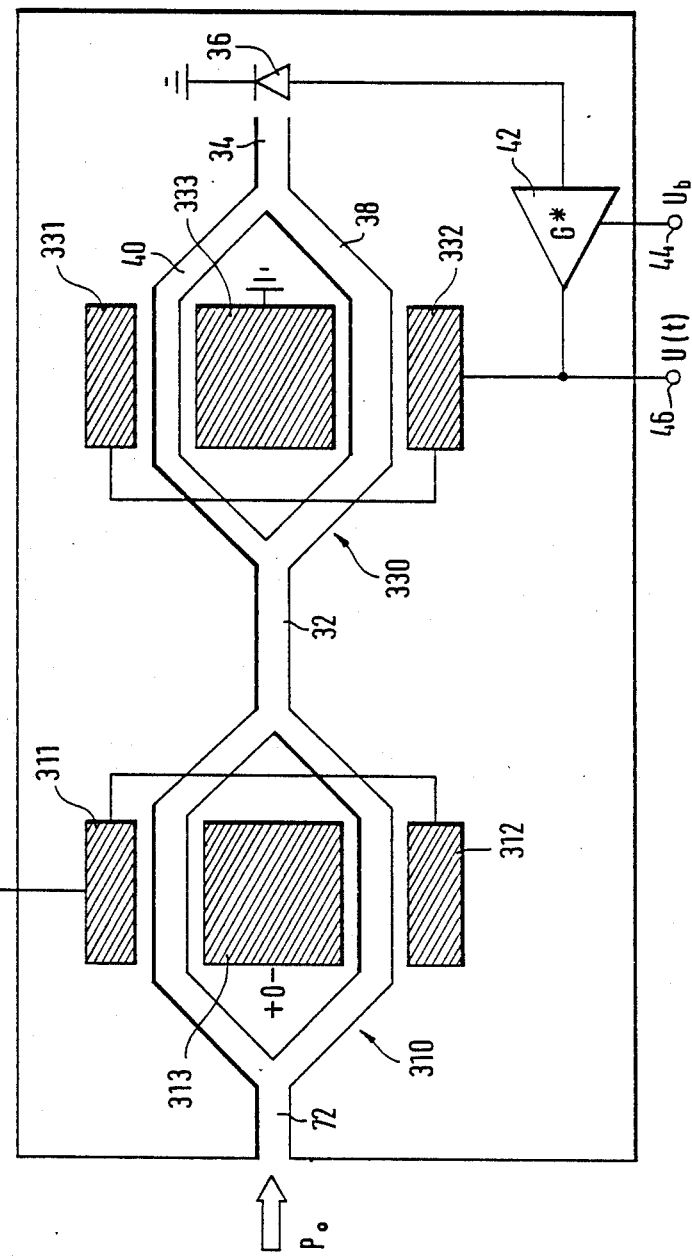
FIG. 3 shows schematically an element of an A/D converter, which is acted upon by a variable light intensity.

FIG. 3 shows an embodiment of a base element of an opto electronic ADC comprising two serially-connected Mach Zehnder interferometers 310,330. The second interferometer 330 having input gate 32 and output gate 34 is the multistable element, while the first interferometer 310 serves as an electro optical phase modulator. Both interferometers 310, 330 are controllable via electrodes 311,312, 313 and 331, 332, 333. The electrodes 311, 312 and 331, 332 respectively are parallel connected and are connected to input terminals 70 and 46 respectively. The electrode 313 lies at a positive bias voltage (+), whereas the electrode 333 lies at earth. With voltage pulses at the terminal 70 the input light power $P_o$ coupled into the gate 72 is periodically disconnected as the analog signal to be digitalised, which is applied to the gate 32, in order, thereby, to set the multistable interferometer 330 to zero for each new digitalisation. This is dealt with in greater detail below with reference to FIG. 5. As a result the jumps in the "upward" branch of the G-u* characteristic shown in FIG. 2 are used for digitalisation.

The transmission characteristics of the multistable Mach Zehnder interferometer is described by Eqns. (1) to (3) as are those of the Michelson interferometer, in which here $P_+$ reaches a photodiode 36, while $P_-$ is absorbed by the substrate. The branching ratio for the coupled light power in the directional input coupler of the second, multistable interferometer 330 and thus the interference contrast $\mu$ is defined by non symmetry of the interferometer arms 38, 40, brought about by unequal diameters or branching angles. Integration of photodiode 36 and amplifier 42 on the same chip as the interferometers 310, 330 is conceivable but not necessary. The output of the photodiode 36 is connected up to an amplifier 42, its output signal being applied to the two electrodes 331, 332 of the interferometer 330. The offset voltage $U_b$ is applied to the terminal 44. The digitalised output signal U is tapped at a terminal 46. If the feedback delay time in this arrangement is greater than the time constant $\tau$ because of the delays in the amplifier, then the said time constant has to be increased by suitable means, in order to obtain the desired number of stable states of the interferometer by a sufficiently small $T/\tau$.

Figure 4:
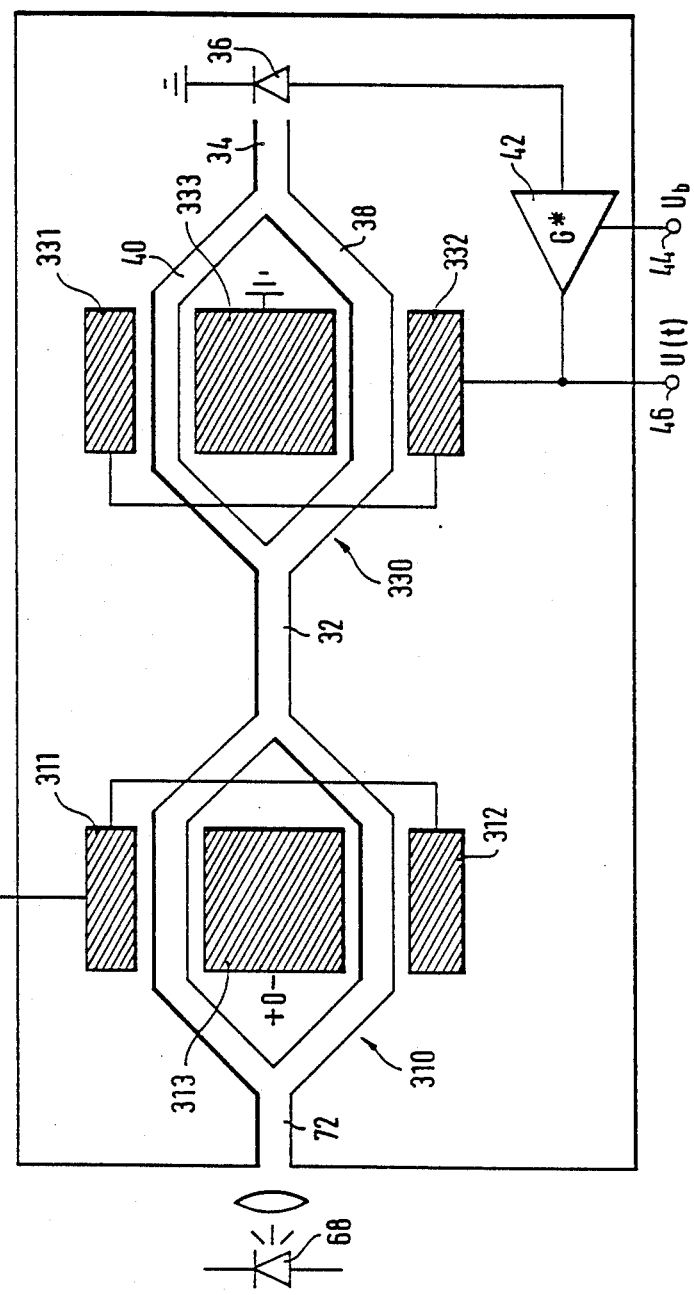
FIG. 4 shows in the same representation as in FIG. 3 an element of an A/D converter which is acted upon by a variable input voltage.

With the embodiments according to FIG. 4, in order to digitalise an electrical analog signal, light of constant intensity from a laser diode 68 is coupled into the input gate 72 of the first interferometer 310. An electrical analog signal $U_{in}$ is applied to the terminal 70. The output of the second multistable interferometer 330 may in this case be set to zero e.g. by periodically disconnecting the laser diode 68 before each measurement cycle. For the first interferometer 310, which acts as an electro optical switch or modulator $\mu=T=1$. The center electrode 313 is kept at constant positive bias voltage (+), so that $\phi=\pi/2$ and the operating point therefore lies in the steep part of the characteristic. Small changes in voltage at the contact 70 then produce proportional changes in output power of the interferometer 310 by means of $\Delta\phi(U_S)$ and thus changes in the input power of the multistable interferometer 330.

An individual multistable interferometer, as described above in relation to FIGS. 3 and 4, may convert a continuously changing input signal into discrete output states (light intensities or electrical voltages), in which the maximum number is determined theoretically by the intererence contrast $\mu$ and the characteristic times of the system. In practice, the maximum number of stable states is also limited by the maximum phase shift achievable with the modulator. Each jump to a next higher state requires a phase shift of $\Delta\phi=2\pi$ rad.

While with piezoelectric modulators in glass fibre interferometers a hundred and more discrete states may be taken up via mechanical fibre expansion, electro optical modulators only permit a maximum number of jumps which is smaller by an order of magnitude, depending among other things on the electrode length of the electro optical phase modulator. From this point of view the use of multistable Michelson interferometers instead of Mach Zehnder arrangements is advantageous because the phase shift of the light waves is twice as high with the same modulator voltage as in the first case.

Since with an increasing number of stable states, $T/\tau$ has to become smaller, the speed of the arrangement is necessarily reduced. The fastest conversion may be achieved when binary coding has two stable states, in which the number of defined bits is equal to the number of the interferometers in the ADC. In practice, a compromise is made between an extremely high value coding and a high conversion speed.

Figure 5:
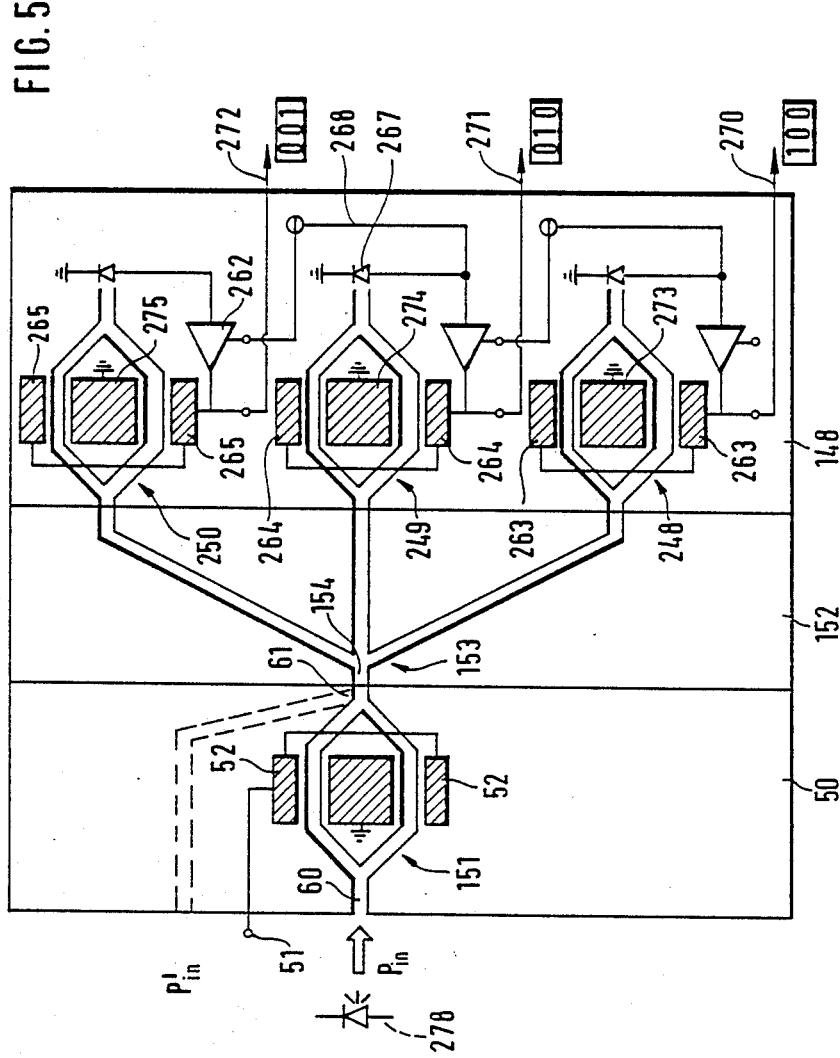
FIG. 5 shows a basic diagram view of an A/D converter with three parallel multistable interferometers and decimal coding.

For the said reasons the construction for example of a 10 bit ADC requires, even with multi value coding, coupling of several multistable interferometers to form a cascade. FIG. 5 shows the construction of an ADC from the example of three coupled elements. A component 50 with an electro optical switch 151 and a component 152 with a glass fibre optical or integratedly optical $1\times 3$—coupler 153 is connected in front of a component 148 having the cascaded multistable elements 248, 249, 250, said coupler 153 distributing the input light intensity to be digitalised and applied to input light intensity to be digitalised and applied to its input 154 equally to the three interferometers 248, 249, 250. All components of these three construction elements may be housed on a single integrated optical chip.

The three interferometers 248, 249, 250 differ by the feedback amplification g and the interference contrast $\mu$. As a result, the interferometers digitalise the analog optical input signal $P_{in}$, which is applied to the input gate 60, in each case with different resolution. The relationships $\mu a/\mu b/\mu c$ and ga/gb/gc may be so selected for example that the analog value in the decimal system appears to be coded at the outputs 270, 271, 272. Thus for example the values according to the following table of the possible value combinations for feedback amplification g and modulation index f of a decimally coded ADC are set.

| $g_a$ | $g_b$ | $g_c$ | $\mu_a$ | $\mu_b$ | $\mu_c$ |
|---|---|---|---|---|---|
| 4 | 2 | 1 | 0.500 | 0.875 | 0.974 |
| 10 | 5 | 1 | 0.100 | 0.812 | 0.918 |

With these values interferometer 249 jumps to the next higher stable state when there is a ten times higher light output, interferometer 248 when there is a hundred times higher light output than interferometer 250.

The three interferometers are electrically connected so that when there is a jump of a higher value interferometer (e.g. 249) the corresponding voltage value, which is emitted by the photo diode 267 is subtracted in the feedback circuit 268 as an offset voltage from the actual modulator voltage, which is applied via the amplifier 262 of the lower value interferometer 250 to its parallel connected electrodes 265. Through this switching the modulator voltage of the interferometers 250 and 249 is reset to the starting value when there is a continuous increase in the input light intensity $P_o$ in each case during the tenth jump. An analog input signal may be broken down during decimal coding with this arrangement into a maximum of 999 increments. The voltage applied to the electrodes is indicated digitally and implemented at each of the three interferometers. The decimal display therefore includes the range of 000 to 999.

In the embodiment described above the analog signal to be digitalised has to be reset to zero because of the said hysteresis characteristic of the multistable elements before each new digitalisation process. The digitalisation is therefore in each case carried out in the "upwards" hysteresis branch of the voltage amplification characteristic (FIG. 2). Resetting may take place via a reset voltage, which is applied periodically clocked via a reset connection terminal 51 to the electrodes 52 of the switch 151. Resetting is also possible by applying the two parallel connected electrodes 263, 264, 265 of the interferometers 248, 249, 250 to the potential of the respective third electrode 273, 274, 275, which preferably has earth potential. As a result the passage is barred by the switch 151 or the interferometers 248, 249 and 250 are set to 0 in each case.

With a changed arrangement the "downwards" hysteresis branch for digitalisation may be utilised. This has the advantage that when the parameters are otherwise the same it is possible to achieve a plurality of stable states as compared to working in the "upward" hysteresis branch. In addition the multistable interferometers 248, 249 and 250 are connected via the switch 151 to maximum input intensity before each digitalising clock pulse instead of to 0. To this end instead of an optical signal to be digitalised a constant sufficiently high light output (e.g. comprising a laser diode 278) is coupled into the electro optical switch 151, which laser diode is disconnected before each digitalisation process, so that thereafter only the (lower) signal level of an analog input signal enters the multistable interferometer 248, 249, 250. This analog input signal ($P_{in}$) may be coupled after the switch 151 into an additional input gate 61 for the subsequently connected 2×3—coupler 153. A further possibility for the resetting when working in the "downwards" hysteresis branch lies in connecting the electrodes 263, 264, 265 of the interferometers 248, 249, 250 to a voltage level in a periodically clocked manner, said level being higher than the highest signal level to be expected.

Since the increase in the "downwards" hysteresis branch of the u* - G characteristic (FIG. 2) of a multi-stable interferometer (i.e. its digital resolution according to Eqn. (5)) in contrast to the increase in the "upwards" branch does not depend on the interference contrast $\mu$, the different digital resolution of the various interferometers of the ADC are adjusted in a different way in this case. To this end the individual interferometers 248, 249, 250 may be provided with electrodes 263, 264, 265 of different length at the electro optical modulators. The interferometer with the highest resolution thus includes the longest electrodes. As a result, in Eqn. (3) $U_\pi$ is smaller. Instead of the value pairs (g,$\mu$) when using the "downwards" hysteresis branch the pairs (g, $U_\pi$) for the individual interferometers of the ADC are set accordingly for the desired coding (binary, hexadecimal, decimal).

The circuit according to FIG. 5 may be used in principle for the resolution and display of analog electrical signals as described in outline with reference to FIG. 4. The signal is applied to the input terminal 51 of the electrode 52 of the switch 51, while a periodically clocked optical signal is applied to the switch via the input gate 60 of the switch 151. One of the remaining previously described reset processes may be used.

It will be understood that the above description of the present invention is susceptible to various modifications, changes and adaptations.

What is claimed is:

1. An opto-electonic A/D converter with a plurality of parallel connected optical waveguide interferometers acted upon by a single input light source, said interferometer having electrodes arrange parallel thereto the optical path lengths of said interferometers being defined by electrical fields between said electrodes, a respective photodiode being connected after each of said interferometers, said photodiodes transforming the output signal of said interferometers in each case into an electrical voltage, said electrical voltages being amplified and displayed, wherein a common input interferometer is connected in front of a common input of a plurality of parallel multistable interferometers, said input interferometer being acted upon by said input light source and having electrodes for application of an electrical input voltage, each of said parallel interferometers having a respective amplifier connected to receive the output voltage of a respective said photodiode, the amplified output voltages of said photodiodes being connected to said respective electrodes and the output voltage of a said respective photodiode of a higher value interferometer is in each case further connected up as the offset voltage to a said amplifier of the interferometer which has a lower value, and the output voltages of said individual amplifiers are tapped in each case as digital signals and from these a coded output signal of the A/D converter is formed, and means are provided for producing a periodically clocked resetting signal.

2. An opto-electronic A/D converter according to claim 1, wherein said light source is of constant intensity and an analog electrical voltage is applied to its electrodes.

3. An opto-electronic A.D converter according to claim 1, wherein said light source is of variable intensity and to its electrodes is applied a clocked voltage for interrupting the passage of light.

4. An opto-electronic A/D converter according to claim 1, wherein said parallel interferometers have an interference contrast $\mu < 1$ produced by asymmetry of said interferometers.

5. An opto-electronic A/D converter according to claim 1, wherein said electrodes of said parallel interferometers have the same length.

6. An opto-electronic A/D converter according to claim 1, wherein the field produced by said electrodes of said parallel multistable interferometers may be reset periodically to a starting value.

7. An optoelectronic A/D converter according to claim 6, wherein, in order to produce said resetting signal, setting means are provided, and via said setting means the potential of controllable electrodes of said parallel multistable interferometers may be set to the potential of a respective third electrode of said interferometers.

8. An opto-electronic A/D converter according to claim 6, wherein, in order to produce said resetting signal, potential raising means are provided, and via said potential raising means the potential of contrallable electrodes of said parallel multistable interferometers may be raised to a level greater than the maximum signal level of the input signal of said A/D converter.

9. An opto-electronic A/D converter according to claim 1, wherein in order to produce said resetting signal a constant light source ($P'_{in}$) acting periodically on said common input of said parallel multistable interferometers is provided, its light output being higher than than of the optical useful signal ($P_{in}$).

10. An opto-electonic A/D converter comprising an input light source, and input interferometer acted upon by said light source and having an output, a plurality of parallel multistable interferometers having a common input, said interferometers having respective electrodes arranged parallel thereto defining the optical path lengths thereof, means for applying an electrical input voltage to said electrodes of said input interferometer, the optical output signal from each said parallel interferometer being supplied to a respective photodiode transforming the optical signal into a respective electrical voltage, said electrical voltages being supplied to an input of a respective amplified, each said amplifier comprising, in addition to said input, an offset voltage input and an output, said outputs of said amplifiers being connected to said aspective parallel electrodes of a respective said parallel interferometer and said electrical voltages being connected to said offset voltage inputs of, in each case, a said amplifier of a respective adjacent parallel interferometer, means for forming an output signal of said A/D converter from said output signals of said amplifiers, and means for producing a clocked reset signal.

* * * * *